US005409381A

United States Patent [19]
Sundberg et al.

[11] Patent Number: 5,409,381
[45] Date of Patent: Apr. 25, 1995

[54] EDUCATIONAL DISPLAY DEVICE AND METHOD

[75] Inventors: Mary L. Sundberg, Lake Bluff; Henry J. Robertz, Chicago, both of Ill.

[73] Assignee: Sundberg Learning Systems, Inc., Lake Bluff, Ill.

[21] Appl. No.: 998,960

[22] Filed: Dec. 31, 1992

[51] Int. Cl.$^6$ .................................. G09B 1/00
[52] U.S. Cl. ............................. 434/159; 434/165
[58] Field of Search ............... 434/159, 160, 161, 162, 434/165, 167, 176, 405; 40/109, 488, 490, 491

[56] References Cited
U.S. PATENT DOCUMENTS

| | | | |
|---|---|---|---|
| 956,916 | 5/1910 | Wiederseim | 40/491 X |
| 1,145,512 | 7/1915 | Reed | 434/165 |
| 1,159,740 | 11/1915 | Bray | 40/490 X |
| 1,666,337 | 4/1928 | McDade | 40/491 X |
| 2,040,419 | 5/1936 | Wirth | 434/405 |
| 2,228,403 | 1/1941 | Ross | 40/491 X |
| 2,319,519 | 5/1943 | Rosaire | 434/405 |
| 2,963,806 | 12/1960 | King | 40/491 X |
| 3,106,029 | 10/1963 | Desmond | 434/405 X |
| 4,031,850 | 6/1977 | Gantt | 434/405 X |
| 4,140,895 | 2/1979 | Tatai | 40/109 X |
| 4,262,422 | 4/1981 | Pass | 434/162 X |

Primary Examiner—Gene Mancene
Assistant Examiner—Jeffrey A. Smith
Attorney, Agent, or Firm—Mason, Kolehmainen, Rathburn & Wyss

[57] ABSTRACT

A display device for teaching reading and writing includes a base member made from a blank cut from a sheet having a printed face. The blank is folded and slitted to define a guide collar having an unobstructed display area and an adjacent variable display area. Opaque and transparent display members are mounted in the collar for movement relative to one another and relative to the base member. A representation of a letter of the alphabet appears on the unobstructed display area and on part of the transparent display area. The variable display area has a representation of an object associated with the shape and sound of the letter. The opaque display member has a masking portion with a representation of a clue suggesting the object, and an additional display area having a representation of a motor plan for forming the letter. The display members are moved to employ different display modes including the object or the clue with and without an overlaid representation of the letter. Text matter is printed on the back of the base member.

12 Claims, 5 Drawing Sheets

EDUCATIONAL DISPLAY DEVICE AND METHOD

FIELD OF THE INVENTION

The present invention relates to an improved educational display device for teaching reading and writing and to a method of making the device.

DESCRIPTION OF THE PRIOR ART

The skills of reading and writing require recognition by a student of the appearance and sound of the letters of the alphabet, and require the student to develop the ability to properly form the letters making up words. Many different types of materials and devices have been used in teaching reading, writing, spelling and related skills.

For example, demonstrative materials such as charts, display cards and the like have been used to show or suggest the movements used to form letters of the alphabet. Materials of this type do not address the problem of teaching letter and sound recognition.

Numerous systems have been devised wherein letters of the alphabet are associated with objects beginning with the corresponding letter, for example, "a is for apple", "b is for book" etc. Such arrangements have some utility in teaching the sounds of letters and in teaching spelling, but are not helpful in teaching a student how to write letters by forming them properly.

U.S. Pat. No. 1,864,703 discloses educational blocks formed in the shape of letters of the alphabet. Each block includes a superimposed subject having a name beginning with the corresponding letter of the alphabet. That name appears upon an edge of the block.

U.S. Pat. No. 3,365,198 discloses alphabetical puzzle games with elements that may be assembled to letters of the alphabet to form an animated object having a name starting with that letter.

There is a need for a unified teaching system that is effective in teaching students to recognize letters of the alphabet, to associate the correct sound with each letter and to associate the proper shape with each letter so that the letter is formed properly when written by the student.

The concept of teaching these related skills simultaneously or in an interrelated fashion is incorporated into known instructional methods. However, the results obtained with known methods have not been entirely satisfactory. One reason for the failure of known methods to achieve uniformly satisfactory results is the lack of suitable educational aids or display devices for use in demonstrating the shapes, sounds and methods of forming letters of the alphabet.

U.S. Pat. No. 3,199,238 discloses a display device including a base sheet or envelope with a window. A slide arrangement including pliable sheets is manipulated to cause either of two messages to be visible in the window.

U.S. Pat. No. 2,611,201 discloses a display apparatus with overlaid sheets, one of which is transparent. The sheets contain representations of structural components. An opaque panel is inserted between the sheets to blank out one of the representations.

SUMMARY OF THE INVENTION

It is a principal object of the present invention to provide an improved educational apparatus for use in teaching the sound and form of a letter of the alphabet. Another object is to provide an educational device useful in teaching reading and writing or for other purposes. Another object is to provide a method for making an improved educational device.

In brief, the above and other objects and advantages of the invention are achieved by providing educational apparatus for use in teaching the sound and form of a letter of the alphabet including a generally flat, planar base including a front surface and a back surface. The front surface has an unobstructed display area including a graphical representation of the letter of the alphabet and also has an adjacent variable display area near the unobstructed display area. A display member including an opaque masking display area is mounted on the base for movement between a first position wherein the masking display area covers the adjacent variable display area and a second position wherein the adjacent variable display area is revealed. At least one of the adjacent variable display and masking display areas includes a graphical representation of an object suggesting both the appearance and the sound of the letter of the alphabet.

In brief, in accordance with another aspect of the invention there is provided an educational device for displaying information including a base member having a front surface and a back surface. The base member is formed from a flat sheet of material including opposed first and second faces. The sheet is folded upon itself along a longitudinal seam to define front and back layers of the sheet. Portions of the second face of the sheet face inward toward one another, and portions of the first face of the sheet face outward and comprise at least part of the front and back surfaces. The front layer is cut along a transverse division line to define an unobstructed display area at one side of the division line and an adjacent variable display area at the other side of the division line. The inward facing portions of the folded sheet at the permanent display area are joined at the seam and are attached at a location spaced away from the seam to define a sleeve between the front and back layers. A display member is slidably mounted in the sleeve for sliding longitudinal movement between positions alternatively covering and uncovering the variable display area.

In brief, in accordance with the invention there is provided a method of making an educational display device including the step of printing instructional material on a first face of a sheet of flat planar material having opposed first and second faces. The printing step includes printing instructional information within discrete, side by side first and second display areas. A generally rectangular blank is formed from the sheet. The blank has first and second opposite edges joined by third and forth opposite edges with the first and second areas located generally adjacent the first edge. The blank is severed along a line extending between the first and second display areas from the first edge of the blank to a generally central region of the blank. The blank is shaped into a base member by folding the blank along a longitudinal seam crossing the severed line and extending between the third and fourth edges of the blank. The folding step includes positioning the first face of the sheet in the outwardly facing direction at front and rear surfaces of the base member, with the first and second display areas at the front surface separated by the severed line. The second faces are secured together in the region of the first display area. The first edge is secured to the second edge in the region of the second display area to define a longitudinally extending collar between the second faces. At least one display member is mounted within the collar for sliding movement in the longitudinal direction.

BRIEF DESCRIPTION OF THE DRAWINGS

The invention and the above and other objects and advantages may best be understood from the following detailed description of the embodiment of the invention shown in the accompanying drawings, wherein.

DETAILED DESCRIPTION OF THE INVENTION

Referring now to the drawings, an educational device generally designated as 10 and constructed in accordance with the principles of the present invention is shown in FIGS. 1, 2 and 4-6. In general, the device 10 includes a base member 12 and a pair of display members 14 and 16 mounted for movement relative to the base member 12 and relative to one another.

Manipulation of the display members 14 and 16 relative to the base member 12 results in various display modes of the device 10. Four different display modes are shown in FIGS. 1, 4, 5 and 6. These different modes are useful in achieving effective teaching and learning. In the illustrated embodiment of the invention, the device 10 is intended to be used in teaching recognition of, as well as the sound and shape of, the letter "w". Similar devices may be employed for the other letters of the alphabet to support a system for teaching reading and writing with all of the letters of the alphabet.

The base member 12 is preferably made from a sheet of opaque material such as high quality card stock or the like and includes a front or forward facing surface 18. Approximately half of this surface is an unobstructed display area 20 seen to the right in FIG. 1 and at the center of FIGS. 4, 5 and 6. Display area 20 constantly remains visible at the front surface 18 in all positions of the display members 14 and 16. Graphical matter is printed or otherwise applied to the area 20. This matter includes solid lines 22 and dotted lines 24 emulating on an enlarged scale the lines found on standard school writing paper of the type used by students who are learning to read and write. A graphical representation 26 of the letter "w" is included in the display area 20 in the proper registration with the solid and dotted lines 22 and 24.

Approximately the other half of the front surface 18 is another display area 28 that may be termed a variable display area because it may be altered or masked by the display members 14 and 16. Variable display area 28 is seen in its unaltered and unmasked state in the left portion of FIG. 5. Printed or otherwise applied to the display area 28 is a graphical representation 30 of an object selected to suggest both the sound and shape or form of the letter "w". In the illustrated arrangement the object depicted by graphical representation 30 is a group of waves. The waves are rendered in such a way that they include at least part of the shape of the letter "w".

Figures 3, 7:
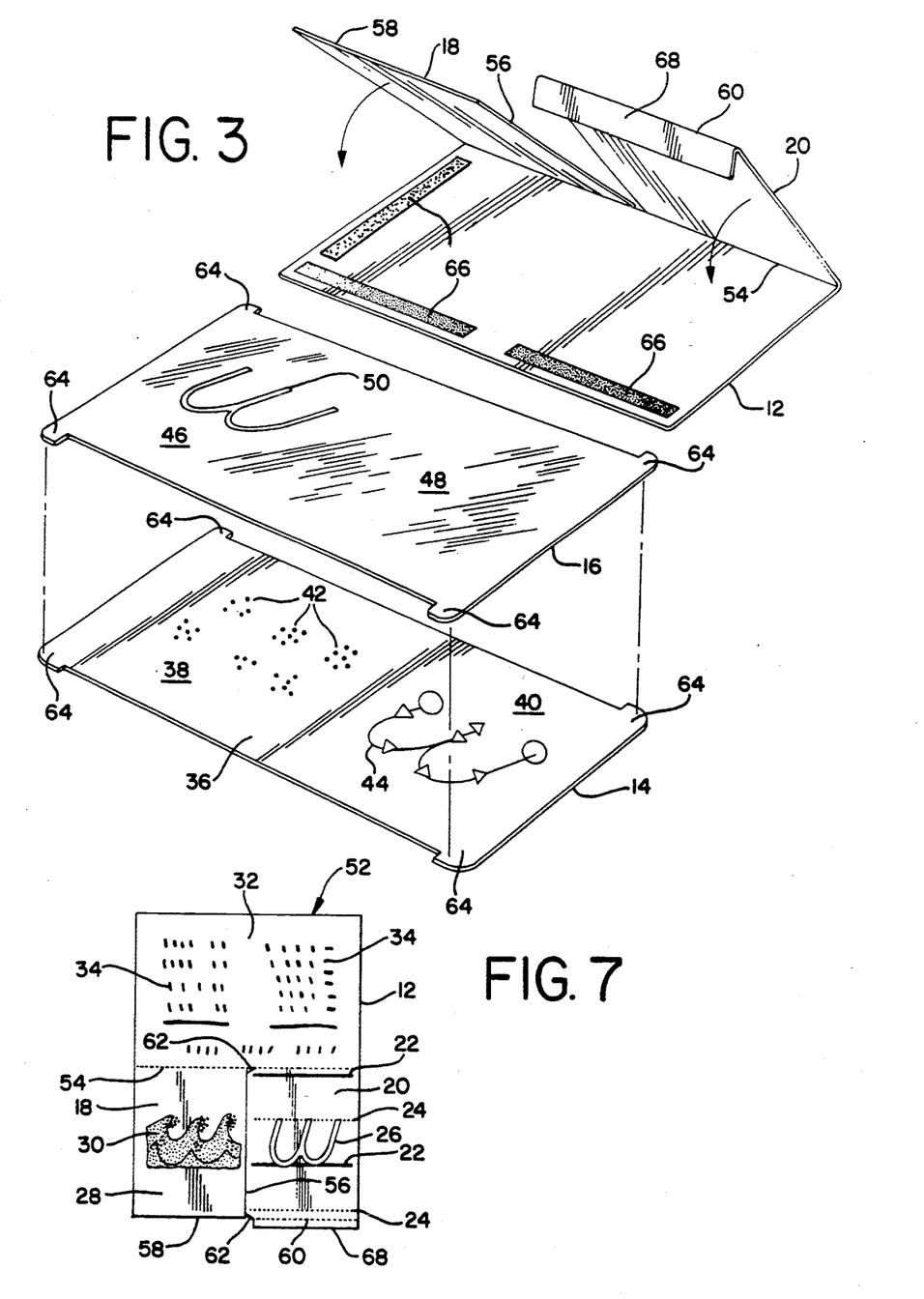
FIG. 3 is an isometric view of the elements of the educational display device prior to assembly.
FIG. 7 is a plan view on a reduced scale of a blank for the base member of the educational display device prior to being shaped as shown in FIG. 3.

A rear facing surface 32 of the base member 12 includes textual material 34 (FIG. 7). In the various display modes of the device 10 seen in FIGS. 1 and 4-6, the front surface 18 can be directed by a teacher toward a student. In this case, the textual matter 34 can be seen by the teacher and not by the student. The textual matter 34 can include instructions and information to aid the teacher in using the device 10.

Figure 4:
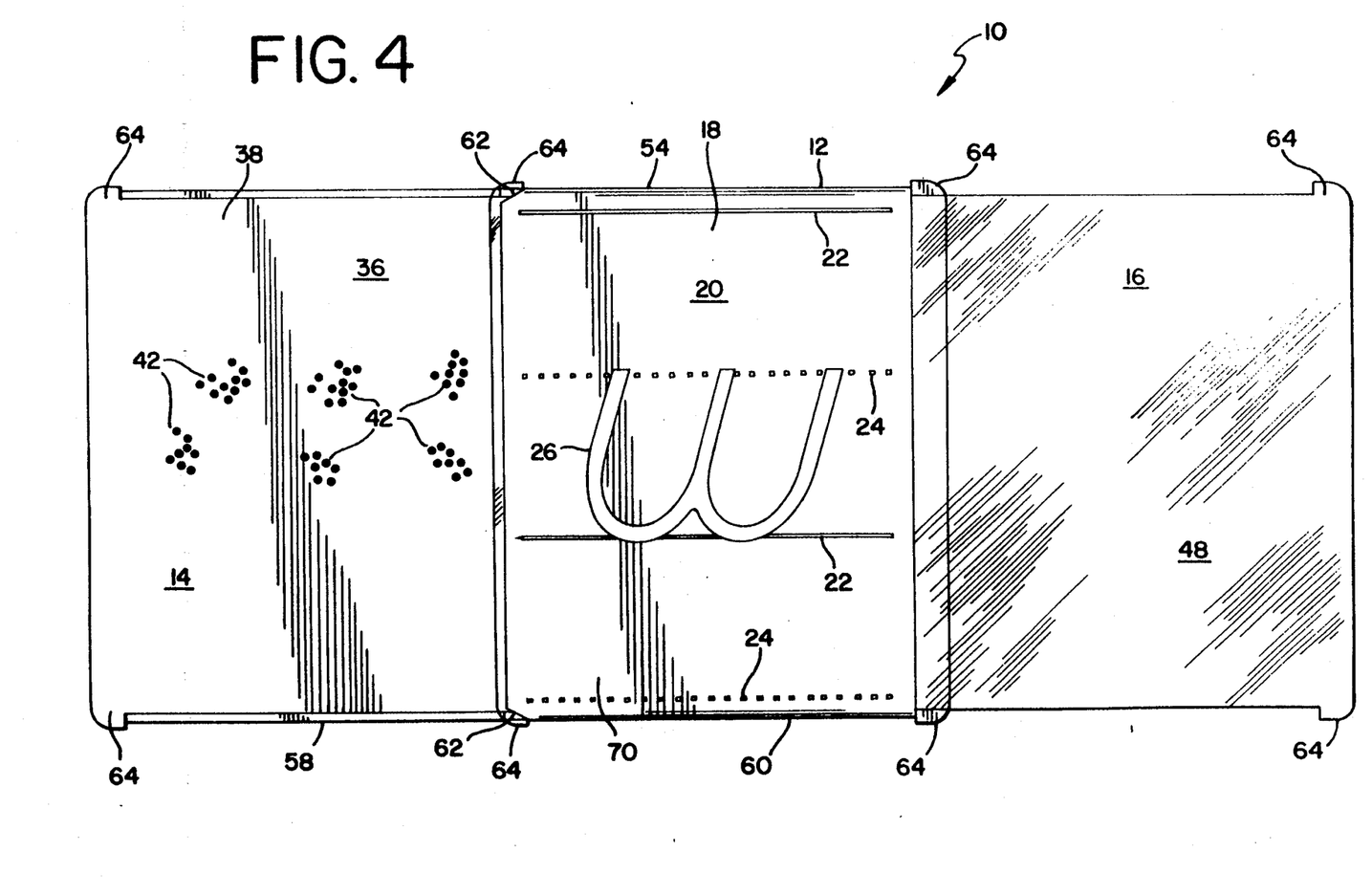
FIG. 4 is a view like FIG. 1 with the display member in the retracted position and the overlay member in an extended position.

Display member 14 is preferably made from a sheet of opaque material such as high quality card stock. It includes a front facing display surface 36 subdivided approximately equally into two display regions 38 and 40. Region 38 is an opaque masking area that can be positioned to cover the variable display area 28 of the base member 12. The masking area 38 is best seen in FIG. 4 where it overlies and conceals the display area 28. Area 38 includes a graphical representation 42 of a portion of the object depicted by graphical representation 30 of the variable display area 28 In the illustrated embodiment of the invention, the representation 30 illustrates waves while the representation 42 illustrates only the bubbles accompanying the waves in the representation 30. The representation 42 serves as a visual clue that suggests the entire object.

Region 40 of the display member 14 is a display area including a graphical representation 44 of the same letter "w" seen in the representation 26 of unobstructed display area 20. However, the representations 26 and 44 differ from one another. While the representation 26 shows the letter alone as it would appear on writing paper, the representation 44 is a motor plan for drawing or writing the letter. The motor plan may include points where a writing instrument should start and stop writing the letter, indications of the directions in which the writing instrument should move, and other instruction matter, textual or graphic, that can assist the student or the teacher. Solid and dotted lines 22 and 24 are employed to simulate the appearance of writing paper.

Figure 1:
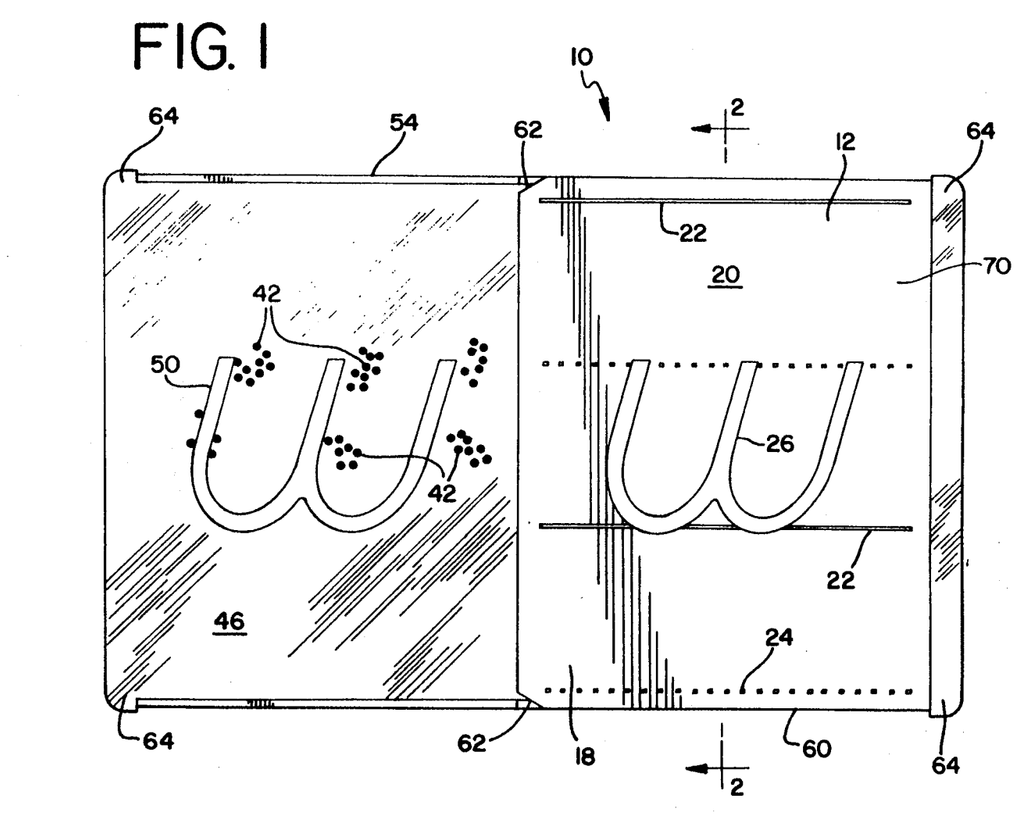
FIG. 1 is a front view of an educational display device constructed in accordance with the present invention in an initial position with a display member and an overlay member in their retracted positions covering a variable display area on a base member.
Figure 6:
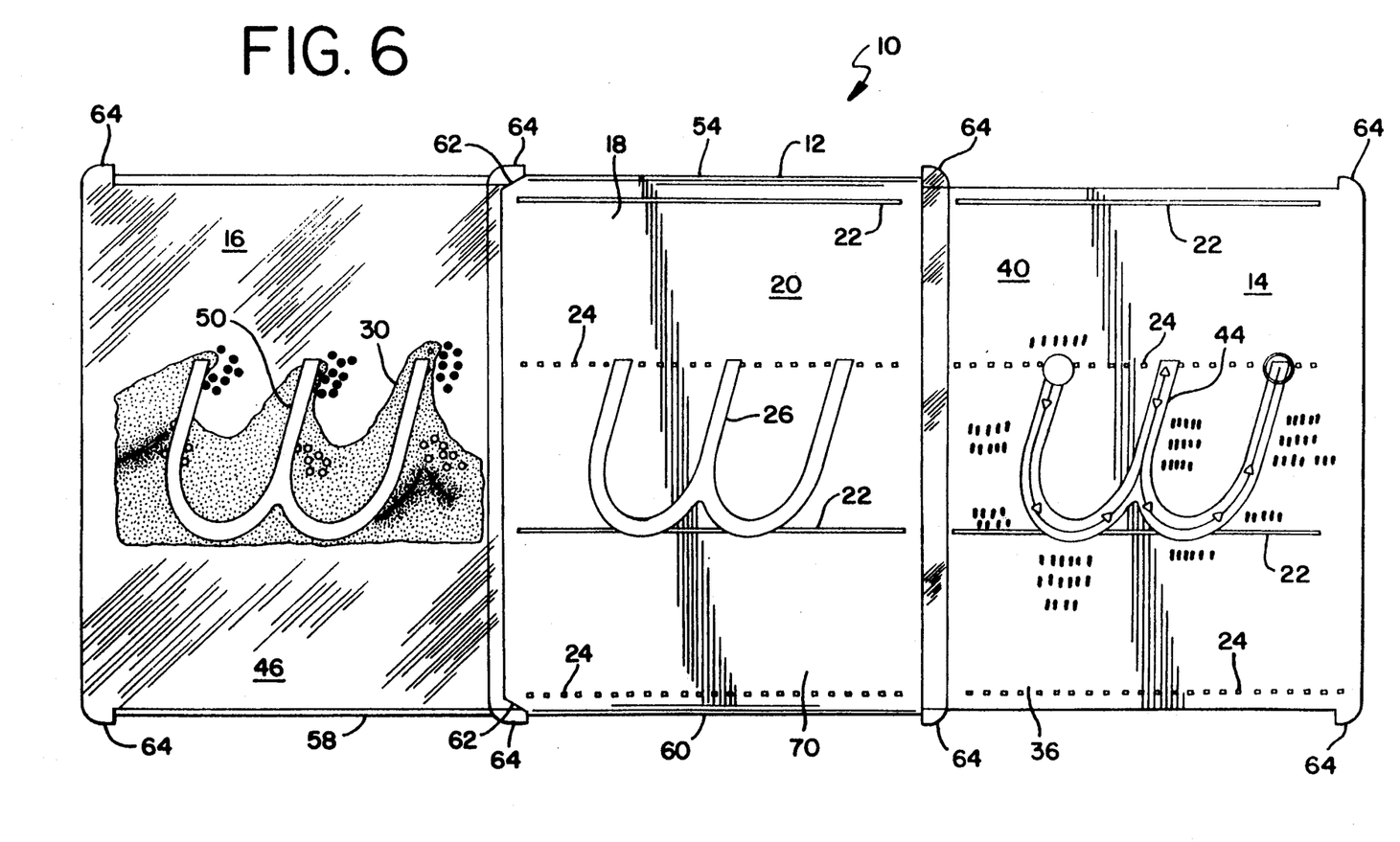
FIG. 6 is a view like FIG. 1 with the overlay member in the retracted position and the display member in an extended position.

Display member 16 is preferably made of transparent sheet material such as a relatively rigid, clear plastic sheet. The member 16 is subdivided approximately equally into two portions 46 and 48. Portion 46 is an overlay area and can be positioned to overlay the variable display area 28 of the base member 12 as seen in FIG. 6 or to overlay the masking display area 38 of the display member 14 as seen in FIG. 1. The overlay area 46 includes a graphical representation 50 of the same letter seen in representations 26 and 44. However, the representation 50 is simpler and includes the letter alone, without motor plan information or writing paper line representations. The region 48 functions as a transparent window and does not include graphical or textual information.

In the preferred method for making the display device 10, the base member is made by printing and cutting a blank 52 (FIG. 7) from a sheet of material. The blank is subdivided by a first fold line indicated by dotted line 54. The blank is cut and slit at line 56. The slit 56 extends from an edge 58 of the blank to the fold line 54 and separates the variable display region 28 from the unobstructed display region 20. A second, shorter fold line is indicated by the dotted line 60. Small relief areas 62 are cut from the sheet at the opposite ends of the slit 56.

The graphical and textual matter 26 (on region 20), 30 (on region 28) and 34 (on rear surface 32) are printed onto the sheet material either before or after the blank 52 is cut from the sheet. As seen in FIG. 7, all of the printed material is on the same face of the blank despite the fact that the printed material is on both the front and rear surfaces 18 and 32 of the completed base member 12. An advantage is that it is less expensive to print one face of a sheet than it is to print both faces.

The display members 14 and 16 are cut from sheets of opaque and transparent material respectively. The members 14 and 16 preferably have the same shape, best seen in FIG. 3. Each is generally rectangular and is provided with stop projections 64 at each of its four corners.

In order to assemble the device 10, the blank 52 is folded to form a seam at fold line 54. The blank 52 is folded so that the unprinted face is directed in upon itself and so that the printed face seen in FIG. 7 is directed outward in both the forward and rear direction to form the forward and rear surfaces 18 and 32. Adhesive 66 is applied as seen in FIG. 3. In the region of the variable display area 28, the adhesive 66 holds the unprinted faces together to serve as a double thickness panel.

Figure 2:
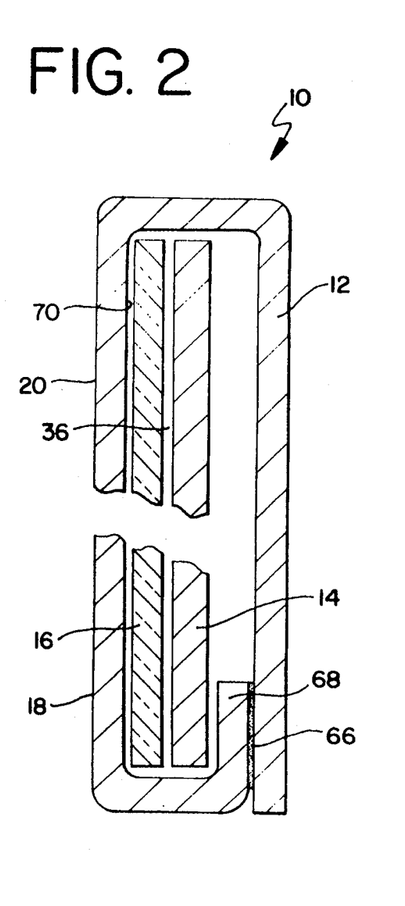
FIG. 2 is a fragmentary, sectional view on an enlarged scale of the educational display device, taken along the line 2—2 of FIG. 1.

The display members 14 and 16 are placed over the double thickness portion and the blank is folded at the second fold line 60 to define reversely bent tab 68 that wraps around the edges of the members 14 and 16. The tab 68 is attached by adhesive 66 to the edge of the unprinted face of the blank in the region of the unobstructed display area 20. The interfacing unprinted faces are spaced apart as seen in FIG. 2 to define a guideway or collar 70 in which the display members 14 and 16 are captured. Each display member 14 and 16 can slide back and forth between alternate positions defined by the stop projections 64. The projections 64 enter the relief areas 62 to fully uncover the variable display area 28.

When the display device 10 is used as an aid to teaching the sound and shape of a letter of the alphabet, the display members 14 and 16 can easily be moved relative to one another and relative to the base member 12 to employ the different display modes seen in FIGS. 1 and 4-6. In the display mode seen in FIG. 5, the display members 14 and 16 are both in their extended positions, having been moved to the right (as illustrated) through the collar 70. The unobstructed display area 20 and the variable display area 28 are visible side by side. This display mode is useful for showing a student the relationship between the illustration 30 of waves and the illustration 26 of the letter "w" in the illustrated embodiment.

In FIG. 6, the transparent display member 16 is moved to the retracted position (to the left as illustrated) while the display member 14 remains in the extended position. Here the illustration 50 of the simple letter "w" on the overlay area 46 of the display member 16 overlies and is aligned with the illustration 30 of waves. This display mode is useful for reinforcing the relationship between the letter and the illustration of the object evoking the shape and sound of the letter. The display member 16 can easily be slid back and forth between the positions of FIG. 5 and FIG. 6 while the display member 14 remains stationary relative to the base member 12. Thus the superimposed illustration 50 can be added and removed from the illustration 30.

Figure 5:
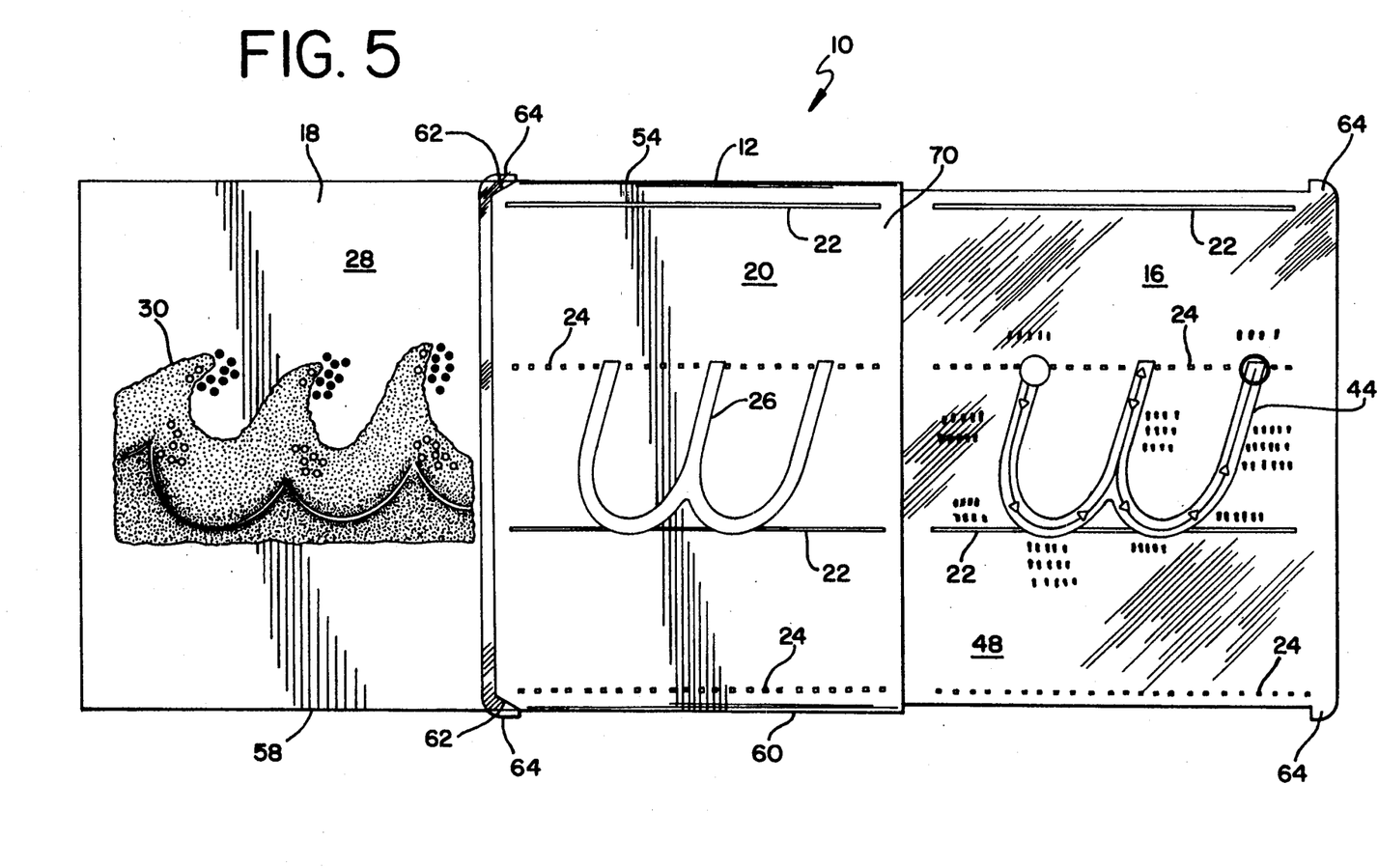
FIG. 5 is a view like FIG. 1 with the display and overlay members in extended positions.

In both FIG. 5 and FIG. 6, the illustration 44 of the motor plan for the letter "w" is seen on the extended display area 40 of the display member 14. In FIG. 5 the motor plan illustration 44 is seen through the transparent window 48 of the display member 16, while in FIG. 6 the motor plan illustration 44 is uncovered. Either mode may be used when the teacher or student wishes to refer to the motor plan. In the mode of FIG. 5, a student may trace upon the transparent window 48 over the motor plan 44, following the motor plan to write the letter.

In the display mode of FIG. 4, the display member 14 is in its retracted position (to the left, as illustrated) and the display member 16 is in the extended position (to the right as illustrated). The unobstructed display area 20 and the opaque masking area 38 are visible side by side. This display mode is useful for showing a student the relationship between the illustration 26 of the letter of the alphabet and the illustration 42 of a clue suggesting the object having the shape and sound of the letter. This juxtaposition helps the student to recognize the letter without the need for the illustration of the entire object.

When the display member 16 is moved to the retracted position from the extended position of FIG. 4, the device 10 is in the display mode seen in FIG. 1. Here, the illustration 50 of the simple letter "w" on the overlay area 46 of the display member 16 overlies and is aligned with the illustration 42 of the object clue. This display mode serves in a different way from FIG. 6 to reinforce the association between the letter and the object. By sliding the display member 16 back and forth in the collar 70, the device 10 can easily be alternated between the modes of FIG. 1 and FIG. 4. This alternation is yet another way to help the student connect the letter with the sound and shape of the letter and the related object.

The invention has been described in connection with the details of the illustrated embodiment. The invention can take other forms and can be carried out in other ways. The details of the illustrated invention should not be taken to limit the scope of the invention as set forth in the following claims.

What is claimed and desired to be secured by letters patent of the United States is:

1. Educational apparatus for use in teaching the sound and form of a letter of the alphabet, said apparatus comprising;
    a generally flat, planar base including a front surface and a back surface;
    said front surface having an unobstructed display area including a graphical representation of the letter of the alphabet, and said front surface having an adjacent variable display area near said unobstructed display area;
    a display member including an opaque masking display area, said display member being mounted on said base for movement between a first position wherein said masking display area covers said adjacent variable display area and a second position wherein said adjacent variable display area is revealed;

at least one of said adjacent variable display area and said masking display area including a graphical representation of an object suggesting both the appearance and the sound of the letter of the alphabet;

an overlay member including a transparent overlay display area, said overlay member being mounted on said base for movement between a retracted position wherein said overlay display area overlies said adjacent variable display area and an extended position wherein said overlay display area is spaced from said adjacent variable display area;

said overlay display area including a graphical representation of the letter of the alphabet located to register with said graphical representation of said object in said retracted position.

2. Educational apparatus for use in teaching the sound and form of a letter of the alphabet, said apparatus comprising:

a generally flat, planar base including a front surface and a back surface;

said front surface having an unobstructed display area including a graphical representation of the letter of the alphabet, and said front surface having an adjacent variable display area near said unobstructed display area;

a display member including an opaque masking display area, said display member being mounted on said base for movement between a first position wherein said masking display area covers said adjacent variable display area and a second position wherein said adjacent variable display area is revealed;

at least one of said adjacent variable display area and said masking display area including a graphical representation of an object suggesting both the appearance and the sound of the letter of the alphabet;

said masking display area and said adjacent variable display area both including graphical representations of said object, said representations differing from one another;

an overlay member including a transparent overlay display area, said overlay member being mounted on said base for movement between a retracted position wherein said overlay display area overlies said adjacent variable display area and an extended position wherein said overlay display area is spaced from said adjacent variable display area;

said overlay display area including a graphical representation of the letter of the alphabet;

said display element and said display member each being movable independently of the other to permit said overlay display area to overlie either said adjacent variable display area or said masking display area.

3. Educational apparatus as claimed in claim 2, said display member and said overlay member being mounted for sliding motion relative to said base.

4. Educational apparatus for use in teaching the sound and form of a letter of the alphabet, said apparatus comprising:

a generally flat, planar base including a front surface and a back surface;

said front surface having an unobstructed display area including a graphical representation of the letter of the alphabet, and said front surface having an adjacent variable display area near and disposed at a first side of said unobstructed display area;

a display member including an opague masking display area, said display member being mounted on said base for movement between a first position wherein said masking display area covers said adjacent variable display area and a second position wherein said adjacent variable display area is revealed;

at least one of said adjacent variable display area and said masking display area including a graphical representation of an object other than the letter of the alphabet suggesting both the appearance and the sound of the letter of the alphabet;

said display member includes an additional display area visible at a second side of said unobstructed display area opposite said first side when said display member is in said second position; and said additional display area includes a graphical representation of a motor plan for writing the letter of the alphabet.

5. An educational device for displaying information, said device comprising:

a base member having a front surface and a back surface;

said base member being formed from a flat sheet of material including an edge and opposed first and second faces;

said sheet being folded upon itself along a longitudinal seam parallel to said edge defining front and back layers of said sheet;

portions of said second face of the sheet facing inward toward one another, and portions of said first face of the sheet facing outward and comprising at least part of said front and back surfaces;

said front layer being cut along a transverse division line extending from said seam to said edge defining an unobstructed display area at one side of said division line and an adjacent variable display area at the other side of said division line;

said inward facing portions of said folded sheet at said permanent display area being joined at said seam and being attached at a location spaced away from said seam defining a sleeve between said front and back layers, said sleeve having spaced apart open ends; and a display member longer than said sleeve and extending from both said open ends of said sleeve, said display member being slidably mounted in said sleeve for sliding longitudinal movement between positions alternatively covering and uncovering said variable display area.

6. An educational device as claimed in claim 5, further comprising an overlay member slidably mounted in said sleeve for sliding-longitudinal movement between positions alternatively overlying and spaced from said variable display area.

7. An educational device as claimed in claim 6, said display member and said overlay member being movable independent of one another.

8. An educational device as claimed in claim 5, said inward facing second face regions being attached to one another in said variable display area.

9. A method of making an educational display device comprising:

printing instructional material on a first face of a sheet of flat planar material having opposed first and second faces;

said printing step including printing instructional information within discrete, side by side first and second display areas;

forming a generally rectangular blank having first and second opposite edges joined by third and fourth opposite edges from the sheet with the first and second areas located generally adjacent the first edge;

severing the blank along the full length of a line extending between the first and second display areas from the first edge of the blank to a generally central region of the blank;

shaping the blank into a base member by folding the blank along a longitudinal seam crossing the severed line and extending between the third and fourth edges of the blank;

said folding step including positioning the first face of the sheet in the outwardly facing direction at front and rear surfaces of the base member, with the first and second display areas at the front surface separated by the severed line;

securing the second faces together in the region of the first display area;

securing the first edge to the second edge in the region of the second display area to define a longitudinally extending collar having two open ends between the second faces; and mounting at least one display member within the collar for sliding movement through both open ends in the longitudinal direction.

10. A method of making an educational instruction device comprising the steps of:

cutting a blank from a sheet of opaque material;

printing instructional matter on a printed face of the blank;

cutting a first display member from a sheet of opaque material;

cutting a second display member from a sheet of transparent material;

printing instructional matter on the first and second display members;

folding the blank along a seam extending across the blank with the printed face directed out;

slitting the blank from an edge to the seam;

making a collar by attaching edges of the blank together at one side of the seam; and capturing the first and second display members in said collar for sliding movement relative to the collar.

11. An educational display device for teaching the shape and sound of a letter of the alphabet, said display device comprising:

a first display member including a graphical representation of an entire object suggesting the shape and the sound of the letter;

a second opaque display member including a graphical representation of a clue to the object;

a third transparent display member including a graphical representation of the letter; and means for supporting said display members for relative movement to at least display modes wherein:

(a) said graphical representation of the object is uncovered and visible;

(b) said graphical representation of the object is visible through said third display member with said graphical representation of the letter aligned with said graphical representation of the object;

(c) said graphical representation of the object is covered and masked by said second display member, and said graphical representation of the clue is visible; and (b) said graphical representation of the object is covered and masked by said second display member, and said graphical representation of the clue is visible through said third display member with said graphical representation of the letter aligned with said graphical representation of the clue.

12. An educational display device as claimed in claim 11 wherein said first display member is a base member defining a guide structure and said second and third display members are mounted in said guide structure for movement relative to said base member and relative to one another.

* * * * *